(12) United States Patent
Maekawa et al.

(10) Patent No.: US 10,069,360 B2
(45) Date of Patent: Sep. 4, 2018

(54) ELECTRIC ROTARY MACHINE

(71) Applicant: DENSO CORPORATION, Kariya, Aichi-pref. (JP)

(72) Inventors: Takeo Maekawa, Kariya (JP); Keiji Kondou, Kariya (JP); Masayoshi Yamamoto, Kariya (JP); Takashi Sato, Kariya (JP); Tomoyuki Shinkai, Kariya (JP)

(73) Assignee: DENSO CORPORATION, Kariya (JP)

( * ) Notice: Subject to any disclaimer, the term of this patent is extended or adjusted under 35 U.S.C. 154(b) by 199 days.

(21) Appl. No.: 15/003,081

(22) Filed: Jan. 21, 2016

(65) Prior Publication Data

US 2016/0218573 A1 Jul. 28, 2016

(30) Foreign Application Priority Data

Jan. 22, 2015 (JP) .................................. 2015-010236

(51) Int. Cl.
| | |
|---|---|
| *H02K 9/00* | (2006.01) |
| *H02K 1/28* | (2006.01) |
| *H02K 9/19* | (2006.01) |
| *H02K 1/22* | (2006.01) |

(52) U.S. Cl.
CPC ............... *H02K 1/28* (2013.01); *H02K 9/19* (2013.01); *H02K 1/22* (2013.01)

(58) Field of Classification Search
CPC .. H02K 1/28; H02K 9/19; H02K 1/22; H02K 1/30

USPC .................................. 310/52, 54, 58, 59, 61
See application file for complete search history.

(56) References Cited

U.S. PATENT DOCUMENTS

| | | | |
|---|---|---|---|
| 2008/0185934 A1* | 8/2008 | Verhoeven ............. | H02K 17/16 310/211 |
| 2011/0074233 A1 | 3/2011 | Okada et al. | |
| 2013/0134823 A1* | 5/2013 | Yamada ................... | H02K 1/24 310/216.004 |

FOREIGN PATENT DOCUMENTS

| | | |
|---|---|---|
| JP | 2005-006429 A | 1/2005 |
| JP | 2011-120417 A | 6/2011 |
| JP | 2013-126311 A | 6/2013 |
| JP | 2014-072921 A | 4/2014 |

* cited by examiner

*Primary Examiner* — Hanh Nguyen
(74) *Attorney, Agent, or Firm* — Oliff PLC

(57) ABSTRACT

An electric rotary machine includes a stator, which Is fixed to a housing, composed of a stator core having a coil end protruding at an end face of the stator core, a rotor core formed by laminating core sheets, and a rotor having a pair of rotor side-plates sandwiching both end faces of the rotor core. The rotor core is rotatably supported in the housing facing an inner peripheral surface of the stator with a gap between the rotor core and the stator. Either one or both of the rotor side-plates has a concave surface in an outer surface of the side-plate that does not abut the rotor core. An axial distance from the end face of the rotor core to the concave surface increases from an inner diameter side to an outer diameter side.

7 Claims, 4 Drawing Sheets

ELECTRIC ROTARY MACHINE

CROSS-REFERENCE TO RELATED APPLICATION

This application is based on and claims the benefit of priority from earlier Japanese Patent Application No. 2015-10236 filed Jan. 22, 2015, the description of which is incorporated herein by reference.

TECHNICAL FIELD

The present disclosure relates to an electric rotary machine provided with a rotor configured to cool coil ends of a stator.

BACKGROUND

Stator windings of an electric rotary machine where the temperature has risen due to an AC copper loss due to energization or a DC copper loss due to leakage flux are required to be cooled.

Therefore, a spreading method is used as an inexpensive cooling method. This method is that coil ends of windings are cooled by applying oil stored at a position higher than an outer bottom surface of a rotor that is spread by a rotation of the rotor.

An example of spreading method is disclosed in the Japanese Patent Application Laid-open Publication No. 2014-072921, for example.

Techniques disclosed in the Publication No. '921 are as follows.

An electric motor includes a stator fixed to a motor housing, and a rotor disposed so as to face radially inward with respect to the stator.

The rotor is formed by sandwiching both end faces of a rotor core by a pair of retaining plates.

In each of the retaining plates, a plurality of first oil catchers and second oil catchers protrude in an axial direction on end faces on sides not in contact with the rotor core, respectively.

Each of the oil catchers extends linearly in a radial direction to near a vicinity of an outer peripheral edge from a vicinity of an inner peripheral edge of the retaining plate.

As the rotor rotates, the oil catchers hold the oil in the motor housing, and can splash the oil in a rotational direction of the rotor.

However, oil spreading parts (oil catchers) that can splash the oil by the rotation of the rotor are formed so as to extend in a radial direction in the technology disclosed in the Publication No. '921.

Further, the oil catchers protrude in the axial direction and have sectional shapes such that variations of irregularities are large.

Thus, there is a problem that efficiency of the electric rotary machine is reduced due to an increased rotational resistance of the rotor.

SUMMARY

An embodiment provides an electric rotary machine that can supply oil effectively to stator coil ends without increasing rotational resistance of a rotor.

An aspect of an electric rotary machine includes a stator, which is fixed to a housing, composed of a stator core having a coil end protruding at an end face of the stator core, a rotor core formed by laminating core sheets, and a rotor having a pair of rotor side-plates sandwiching both end faces of the rotor core.

The rotor core is rotatably supported in the housing facing an inner peripheral surface of the stator with a gap between the rotor core and the stator.

Either one or both of the rotor side-plates has a concave surface in an outer surface of the side-plate that does not abut the rotor core.

An axial distance from the end face of the rotor core to the concave surface increases from an inner diameter side to an outer diameter side.

According to the above configuration, in the electric rotary machine, either one or both of the rotor side-plates has the concave surface in the outer surface of the side-plate that does not abut the rotor core.

The axial distance from the end face of the rotor core to the concave surface increases from the inner diameter side to the outer diameter side.

Therefore, the oil stuck to the concave surface of the rotor side-plate flows along the concave surface by centrifugal force, and is effectively dispersed on an inner peripheral surface of the coil end so that it is possible to improve the cooling effect of the windings.

In addition, since the curved surface of the concave surface is facing the direction away from the gap formed between the rotor core and the stator core, the oil is hardly penetrates into the gap.

Moreover, since the variations of irregularities in the circumferential direction of the rotor side-plates are small, there is an excellent effect of suppressing frictional losses from occurring during the rotor rotation.

BRIEF DESCRIPTION OF THE DRAWINGS

In the accompanying drawings:

FIG. 8 shows a perspective sectional view of a half of a rotor side-plate to be implemented by applying the fifth embodiment to the third embodiment or the fourth embodiment;

DETAILED DESCRIPTION OF THE PREFERABLE EMBODIMENT

Figure 1:
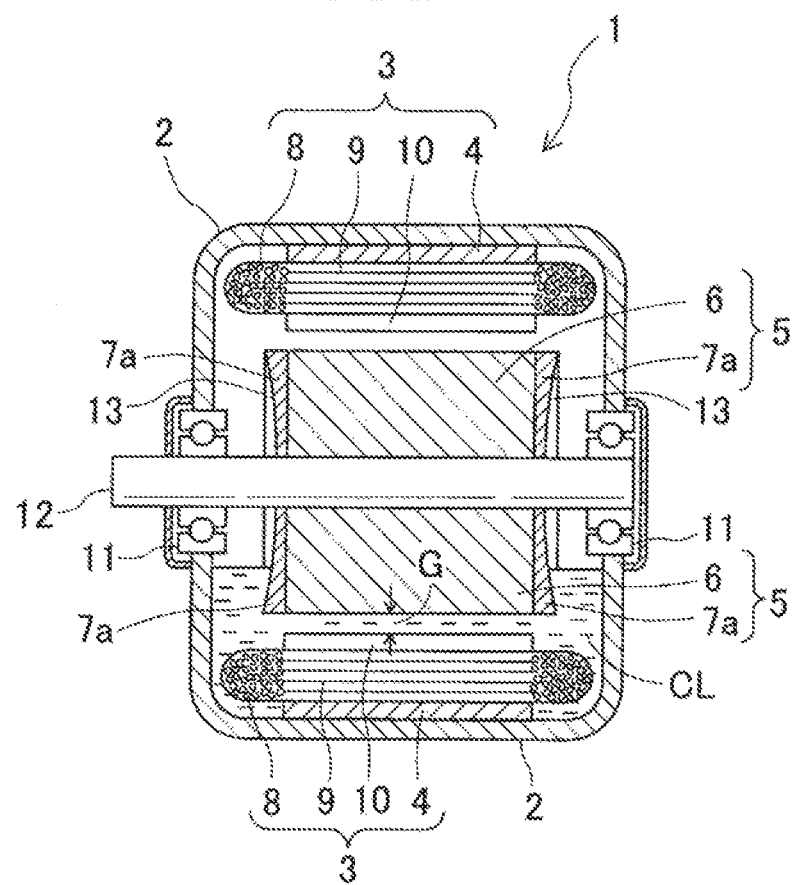
FIG. 1 schematically shows a configuration of an electric rotary machine according to the present disclosure, as well as shows a sectional view of rotor side-plates in a first embodiment.

Hereinafter, embodiments embodying the present disclosure will be described with reference to the drawings.

It should be appreciated that, in all of drawings throughout the specification, components identical with or similar to each other are given the same reference numerals, and repeated structures and features thereof will not be described in order to avoid redundant explanation.

An electric rotary machine 1 shown in FIG. 1 according to an embodiment of the present disclosure is intended for a motor or generator that is frequently used in a vehicle or the like.

The electric rotary machine 1 includes a stator 3 and a rotor 5.

As shown in FIG, 1, the stator 3 is formed of a cylindrical stator core 4 and windings 9 wound around slots 10 engraved on an inner peripheral surface of the stator core 4.

The stator 3 is fixed to an inner peripheral surface of a housing 2 that is constituted in a liquid-tight manner.

The windings 9 made of copper wire, etc., are protruding from end faces of the stator core 4 and are folded back to from coil ends 8.

The stator core 4 is formed of a magnetic material, and is formed by laminating electromagnetic steel sheets made of a thin plate such as silicon steel in an axial direction of a rotation of the rotor 5, for example.

The rotor 5 includes a cylindrical rotor core 6, and annular rotor side-plates 7a fixed to both end faces of the rotor core 6 so as to sandwich the rotor core 6.

The rotor 5 is rotatably supported in the housing 2 by a shaft 12 and bearings 11 fixed to a rotation shaft of the rotor core 6. The rotor 5 is rotatably supported facing an inner peripheral surface of the stator core 4 with a gap G therebetween.

The rotor core 6 is formed of a magnetic material, and is formed by laminating electromagnetic steel sheets as core sheets made of a thin plate such as silicon steel in the axial direction.

Although not shown in detail, magnets are disposed on an outer periphery of the rotor core 6 by means of gluing, embedding, or the like at appropriate intervals corresponding to a laminating thickness of the stator core 4.

Oil CL is stored in a bottom of the housing 2 in a range that at least a bottom of the outer periphery of the rotor core 6 soaks but the shaft 12 of the rotor core 6 does not soak.

The type of the oil CL is not limited as long as it is an insulating coolant, and oils such as transmission oil, engine oil, or hydraulic control oil may be utilized.

[First Embodiment]

As shown in FIG. 1, either one or both of the rotor side-plates 7a fixed to both end faces of the rotor core 6 has a concave surface 13 in an outer surface of the side-plate 7a that does not abut the rotor core 6.

As directing to an outer diameter side from an inner diameter side, an axial distance from the end face of the rotor core 6 to the concave surface 13 increases in a direction that an axial length extends.

Note that FIG. 1 shows an example where the concave surface 13 is disposed on both of the rotor side-plates 7a.

The concave surface 13 may not only be a conical surface, a spherical surface or parabolic surface, but may be a combination thereof, or may be any surface as long as it is recessed smoothly.

The concave surface 13 includes a central opening for allowing the shaft 12 to be loosely fitted.

Note that a flat surface may be disposed on the concave surface 13 near its central opening.

An outer diameter of the rotor side-plate 7a is equivalent to or smaller than an outer diameter of the rotor core 6.

In addition, an outer peripheral edge of the rotor side-plate 7a protrudes axially outward from the end face of the stator core 4.

By this configuration, as shown in FIG. 1, the oil CL stuck to the concave surface 13 of the rotor side-plate 7a flows along the concave surface by centrifugal force, and is effectively dispersed on an inner peripheral surface of the coil end 8 so that it is possible to improve the cooling effect of the windings 9.

In addition, the curved surface of the concave surface 13 is facing a direction away from the gap G formed between the rotor core 6 and the stator core 4, and the outer peripheral edge of the rotor side-plate 7a is protruding axially outward from the end face of the stator core 4.

Therefore, the oil CL hardly penetrates into the gap G, and since amounts of irregularities in the axial direction of the rotor side-plate 7a are small, it is possible to suppress frictional losses from occurring.

[Second Embodiment]

Figure 2:
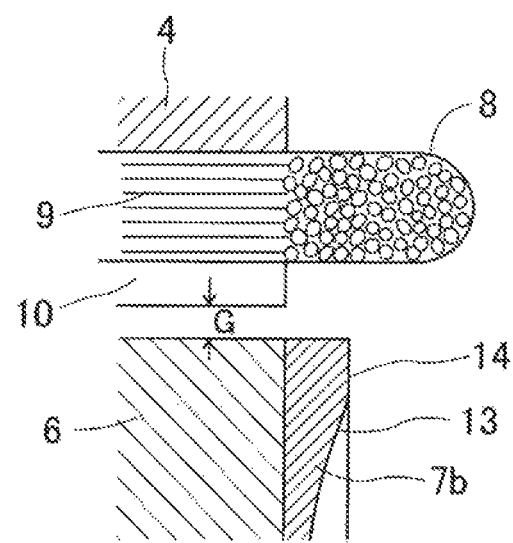
FIG. 2 shows a sectional view of a rotor side-plate in a second embodiment by enlarging an upper right corner portion of the stator and the rotor opposing to each other shown in FIG. 1.
Figure 3:
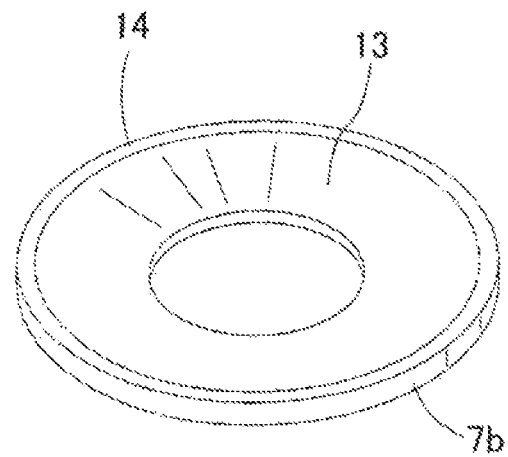
FIG. 3 shows a perspective view of the rotor side-plates in the second embodiment.

As shown in FIGS. 2 and 3, a circular flat surface 14 is disposed on an outer peripheral edge of the rotor side-plates 7b in the concave surface 13 side. The flat surface 14 is formed as a plane perpendicular to the rotation axis of the rotor core 6, and is connected to the concave 13 surface intersecting the outer circumference of the rotor side-plate 7b.

Although not shown, the flat surface 14 may not be circular, but may be arc-shaped at equal intervals.

The remaining details are the same as in the first embodiment.

By this configuration, since the spread oil CL is injected along the flat surface 14 of the rotor side-plate 7b, and the oil CL is sprayed in a wide range in the axial direction of the coil end 8, the cooling effect can be improved.

[Third Embodiment]

Figure 4:
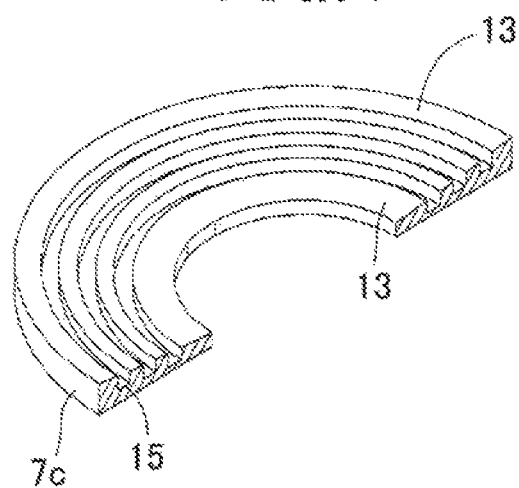
FIG. 4 shows a perspective sectional view of a half of a rotor side-plate in a third embodiment.

As shown in FIG. 4, a plurality of grooves 15 are formed on the concave surface 13 of the rotor side-plate 7c in a circumferential direction.

Although each of the grooves 15 is shown as a circular ring, it may be a circular arc-shaped that is not shown.

In addition, although a sectional shape of the groove 15 is shown as a rectangle, it may be a semicircular shape or U-shape.

Moreover, dimensions, numbers or the like of the grooves 15 can be set appropriately.

The remaining details are the same as in the first embodiment.

By this configuration, the grooves 15 disposed on the rotor side-plate 7c become resistance to the oil CL flowing in an outer diameter direction by the centrifugal force and the flow rate is suppressed from increasing.

As a result, the oil CL can be supplied to the entire periphery from the coil end 8 in vicinity where the rotor 5 is away from the oil CL surface to the coil end 8 on a side where the rotor 5 gets closer to the oil CL surface, and the effect of cooling the entire coil end 8 can be improved.

[Fourth Embodiment]

Figure 5:
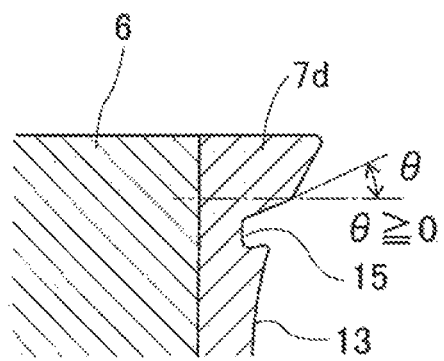
FIG. 5 shows a sectional view of a rotor side-plate and a rotor core in a fourth embodiment.

As shown in FIG. 5, a side wall of the groove 15 in an outer peripheral side of the rotor side-plates 7d in the fourth embodiment is a surface parallel to the rotary shaft of the rotor core 6 or open to the outside with an opening angle θ.

The remaining details are the same as in the first embodiment.

Figure 6:
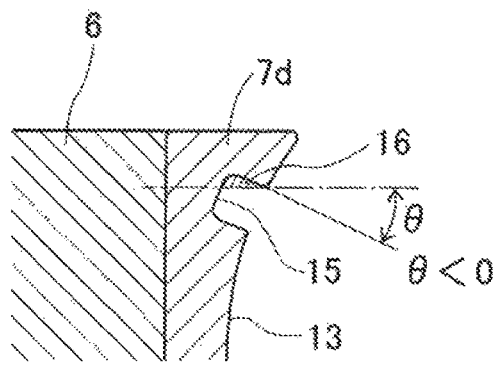

By this configuration, when the oil CL collected in the groove 15 receives the centrifugal force, unlike remained oil 16 shown in FIG. 6, the oil CL is released to the coil end 8 side without remaining in the groove 15.

Therefore, it is possible to supply the oil CL collected in the rotor side-plate 7d to the coil end 8 without waste, and the cooling effect can be improved.

Figure 8:
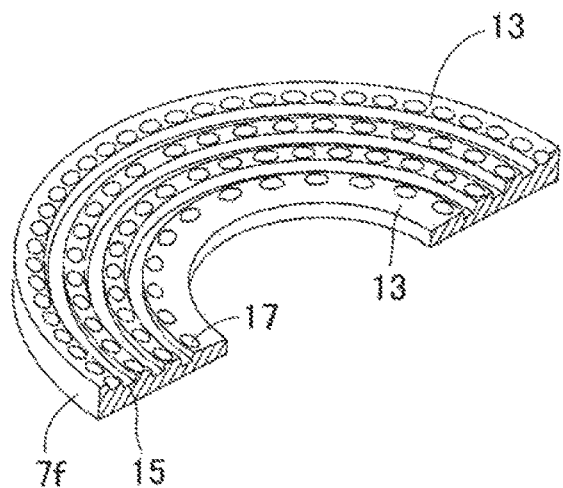
FIG. 8 shows a sectional view of a rotor side-plate and a rotor core that does not implement the fourth embodiment.

As shown in FIG. 8, when the opening angle θ of the side wall of the groove 15 in the outer peripheral side of the rotor side-plates 7d becomes negative and the side wall faces inwardly, the remained oil 16 is generated.

[Fifth Embodiment]

Figure 7:
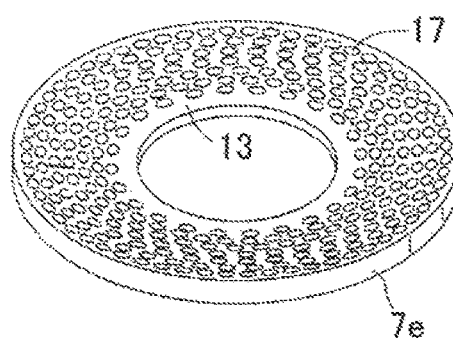
FIG. 7 shows a perspective view of a rotor side-plate in a fifth embodiment.

As shown in FIG. 7, dimples 17 are disposed on the concave surface 13 of the rotor side-plate 7e.

Dimensions, shape, number or the like of the dimples 17 can be set appropriately.

The remaining details are the same as in the first embodiment.

By this configuration, flow resistance of the oil CL on the concave surface 13 of the rotor side-plate 7e increases, and it is possible to extend the time that the oil CL stays on the rotor side-plate 7e.

Therefore, it is possible to supply the oil CL to a wide range of an inner peripheral surface of the coil ends 8, and it is possible to improve the cooling effect.

[Sixth Embodiment]

As shown in FIG. 8, a sixth embodiment is implemented by applying the fifth embodiment to the third embodiment or the fourth embodiment.

Thus, applying of one or any combination of two of the third embodiment to fifth embodiment to any of the first embodiment or second embodiment can be implemented.

By this configuration, the flow rate of the oil CL on the concave surface 13 of the rotor side-plate 7f is suppressed from increasing by the grooves 15 and the dimples 17.

Further, the flow resistance increases and it is also possible to extend the time that the oil CL stays on the rotor side-plate 7f.

Therefore, it is possible to supply the oil CL to a wide range of an inner peripheral surface of the coil ends 8, and it is possible to improve the cooling effect.

[Seventh Embodiment]

Figure 9:
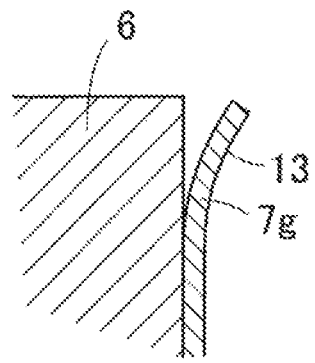
FIG. 9 shows a sectional view of a rotor side-plate and a rotor core in a sixth embodiment.

As shown in FIG. 9, the seventh embodiment shows that the rotor side-plates 7g formed on the concave surface 13 are constituted by plates with a constant thickness.

Note that the rotor side-plates 7g is provided with a flat surface for sandwiching the rotor core 6 near the central opening to which the shaft 12 is inserted.

By this con figuration, inexpensive material can be used for the rotor side-plates 7g.

Figure 10:
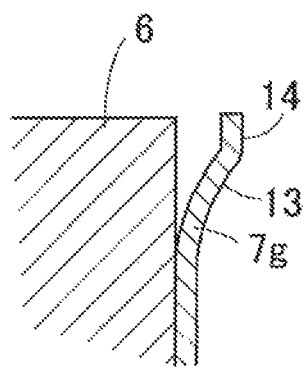
FIG. 10 shows a sectional view of a rotor core in a first variant of the sixth embodiment.
Figure 11:
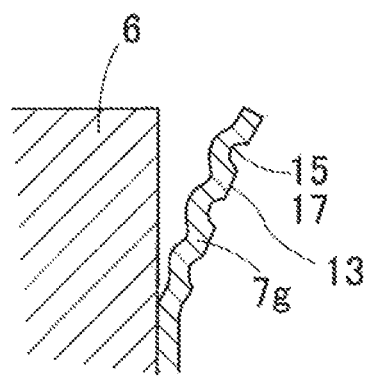
FIG. 11 shows a sectional view of a rotor core in a second variant of the sixth embodiment.

In addition, as shown in FIGS. 9, 10 and 11, a concave surface 13, a flat surface 14, grooves 15 and dimples 17 can be manufactured inexpensively and easily by pressing, thus it is possible to reduce the cost.

As it is clear from what has been described above, in the electric rotary machine 1 of the present embodiment, either one or both of the rotor side-plates 7a to 7g has the concave surface 13 in the outer surface of the side-plate 7a to 7g that does not abut the rotor core 6.

The distance from the end face of the rotor core 6 to the concave surface 13 increases from the inner diameter side to the outer diameter side.

Therefore, the oil CL stuck to the concave surface 13 of the rotor side-plate 7a to 7g flows along the concave surface by centrifugal force, and is effectively dispersed on an inner peripheral surface of the coil end 8 so that it is possible to improve the cooling effect of the windings 9.

In addition, since the curved surface of the concave surface 13 is facing the direction away from the gap G formed between the rotor core 6 and the stator core 4, the oil CL is hardly penetrate into the gap G.

Moreover, since the variations of irregularities in the circumferential direction of the rotor side-plates 7a to 7g are small, it shows an excellent effect to suppress fractional losses from occurring during the rotor rotation.

In addition, the rotor side-plate 7b is provided with the flat surface 14 as the plane perpendicular to the rotation axis of the rotor core 6 on the outer peripheral edge in the concave surface 13 side.

Therefore, the spread oil CL is injected along the flat surface 14 of the rotor side-plate 7b, and the oil CL is sprayed in a wide range in the axial direction of the coil end 8, thus the cooling effect can be improved.

Moreover, since the rotor side-plates 7c has the grooves 15 on the concave surface 13 in the circumferential direction, the grooves 15 becomes resistance to the flowing oil CL, the flow rate is suppressed from increasing.

As a result, the oil CL can be supplied to the entire periphery from the coil end 8 in vicinity where the rotor 5 is away from the oil CL surface to the coil end 8 on a side where the rotor 5 gets closer to the oil CL surface, and the effect of cooling the entire coil ends 8 can be improved.

In addition, the side wall of the groove 15 in the outer peripheral side of the rotor side-plate 7d is the surface parallel to the rotary shaft of the rotor core 6 or open to the outside with the opening angle θ.

Therefore, it is possible to supply the oil CL collected in the rotor side-plate 7d to the coil end 8 without waste, and the cooling effect can be improved.

Moreover, since the rotor side-plate 7e is provided with the dimples 17 on the concave surface 13, the flow resistances of the oil CL on the concave surface 13 of the rotor side-plate 7e increases, and it is possible to extend the time that the oil CL stays on the rotor side-plate 7e.

As a result, it is possible to supply the oil CL to a wide range of an inner peripheral surface of the coil ends 8, and it is possible to improve the cooling effect.

Moreover, since the rotor side-plate 7g is formed by the plate with the constant thickness, while inexpensive material can be used for the rotor side-plates 7g, it can be manufactured by pressing, thus it is possible to reduce the cost.

In addition, the outer peripheral edge of the rotor side-plate 7a to 7g protrudes axially outward from the end face of the stator core 4.

As a result, the oil CL is prevented from entering into the gap G formed between the rotor core 6 and the stator core 4, thus it is possible to reduce the frictional losses.

Note that the present disclosure includes those may be implemented in embodiments with various alterations, modifications, improvements and the like based on the knowledge of those skilled in the art are applied.

Further, needless to mention that embodiments with alterations and the like applied are intended to be included within the scope of the present disclosure as long as not departing from the scope of the present disclosure.

What claimed is:

1. An electric rotary machine comprising:
    a stator, which is fixed to a housing, composed of a stator core having a coil end protruding at an end face of the stator core;
    a rotor core formed by laminating core sheets; and
    a rotor having a pair of rotor side-plates sandwiching both end faces of the rotor core; wherein,
    the rotor core is rotatably supported in the housing facing an inner peripheral surface of the stator with a gap between the rotor core and the stator;

either one or both of the rotor side-plates has a concave surface in an outer surface of the side-plate that does not abut the rotor core;

an axial distance from the end face of the rotor core to the concave surface increases from an inner diameter side to an outer diameter side; and oil is stored in a bottom of the housing in a range that at least a bottom of an outer periphery of the rotor core soaks but a shaft of the rotor core does not soak.

2. The electric rotary machine according to claim 1, wherein, the rotor side-plate is provided with a flat surface in a plane perpendicular to a rotation axis of the rotor core on an outer peripheral edge in the concave surface side.

3. The electric rotary machine according to claim 1, wherein, the rotor side-plate is provided with grooves on the concave surface in a circumferential direction.

4. The electric rotary machine according to claim 3, wherein, side walls of the grooves in an outer peripheral side of the rotor side-plate are surfaces parallel to the shaft of the rotor core or open to an outside with an opening angle.

5. The electric rotary machine according to claim 1, wherein, the rotor side-plate is provided with dimples on the concave surface.

6. The electric rotary machine according to claim 1, wherein, the rotor side-plate is formed by a plate with a constant thickness.

7. The electric rotary machine according to claim 1, wherein, an outer peripheral edge of the rotor side-plate protrudes axially outward from the end face of the stator core.

* * * * *